Feb. 16, 1954
F. A. PALL ET AL
2,669,284
ADJUSTABLE VEHICLE SEAT
Filed May 17, 1948
2 Sheets-Sheet 2
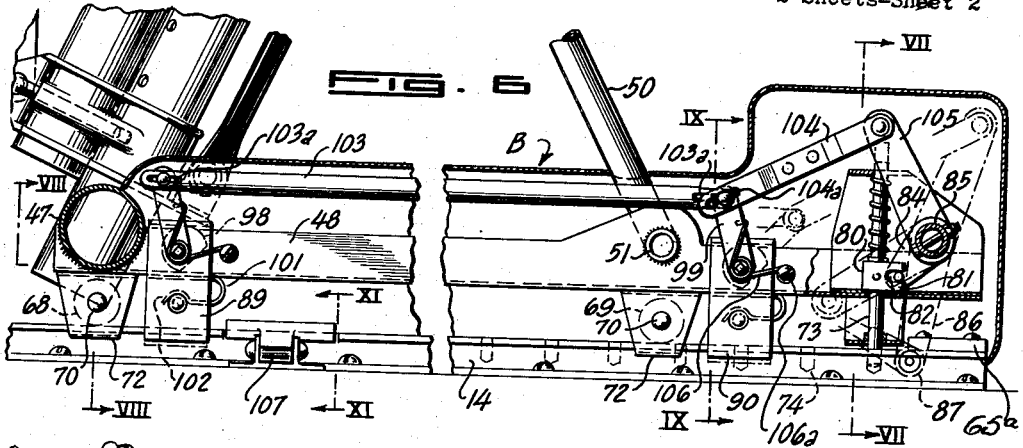
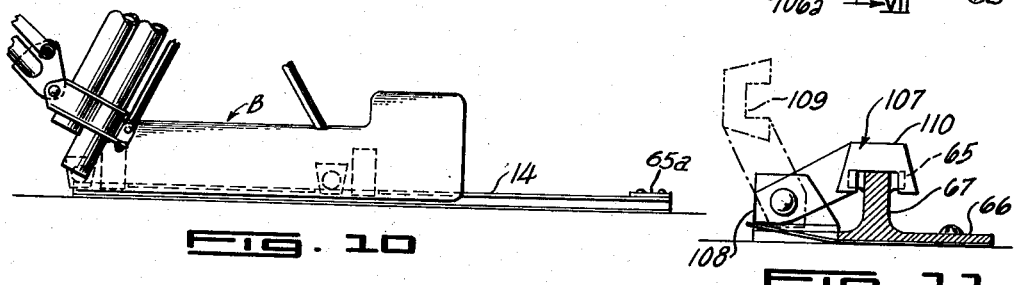
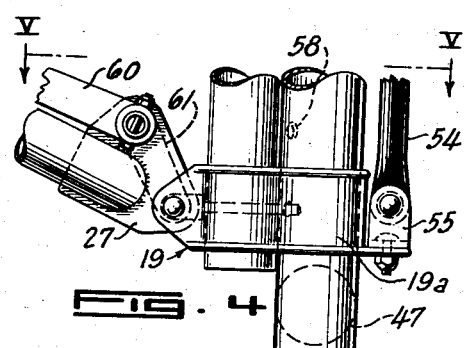
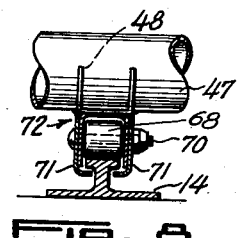
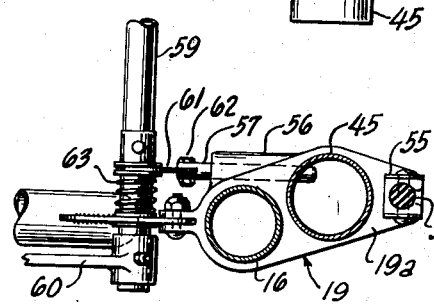
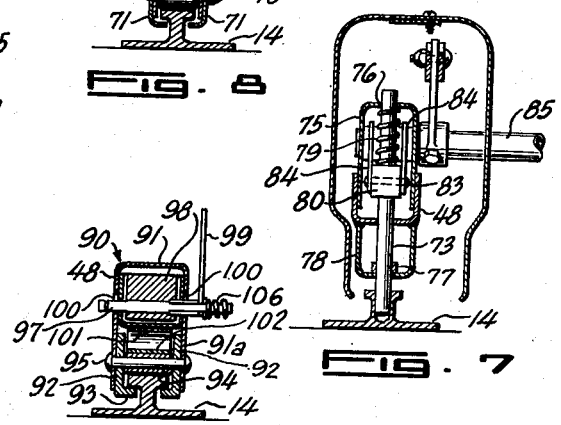
Inventors
Francis A. Pall
& Leo A. Pfankuch
Attorney Patented Feb. 16, 1954

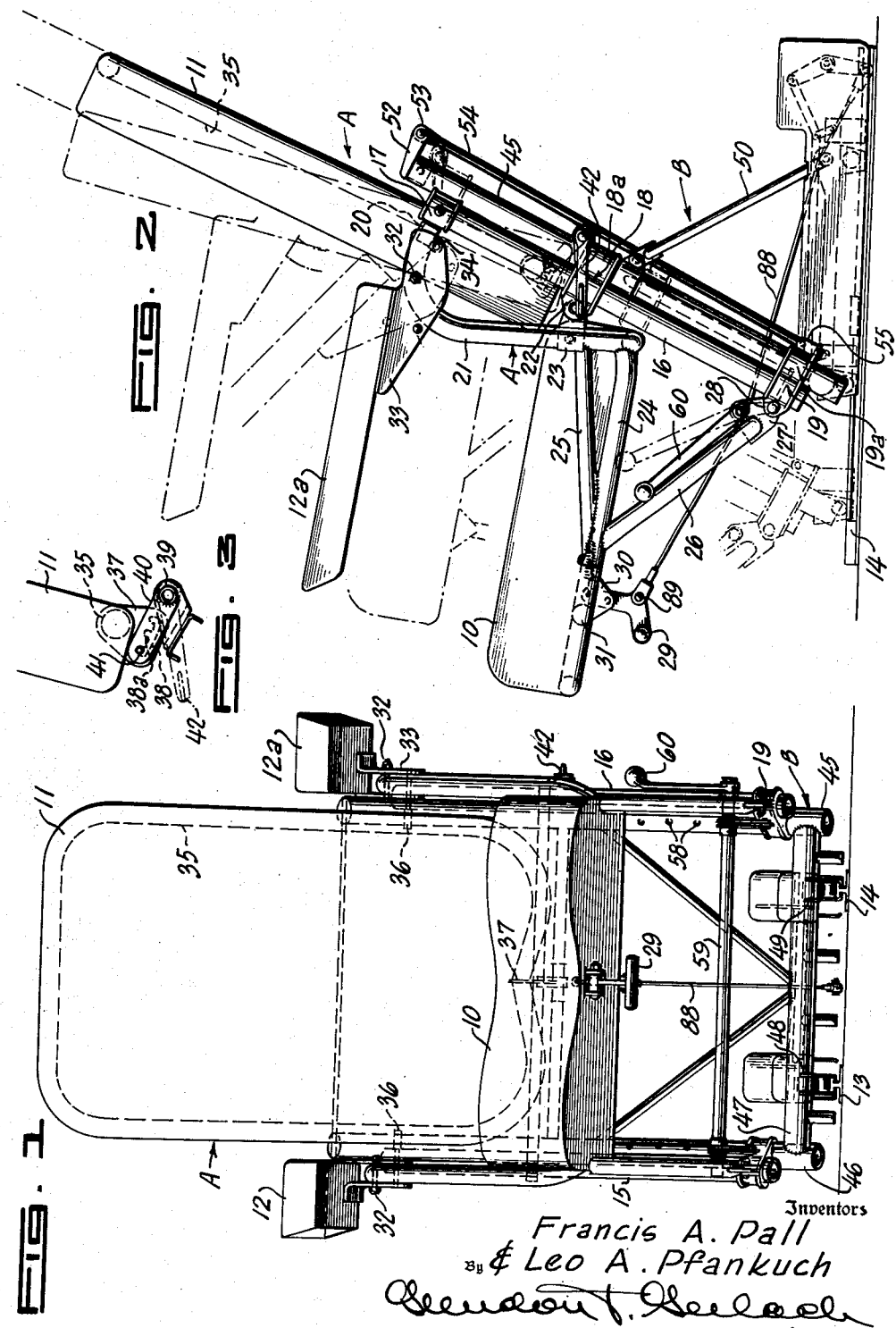

2,669,284

UNITED STATES PATENT OFFICE 2,669,284

ADJUSTABLE VEHICLE SEAT

Francis A. Pall, San Diego, and Leo A. Pfankuch, La Mesa, Calif., assignors to Consolidated Vultee Aircraft Corporation, San Diego, Calif., a corporation of Delaware Application May 17, 1948, Serial No. 27,436

11 Claims. (Cl. 155—14)

This invention relates generally to adjustable operators' seats for vehicles and in particular to an improved form particularly adapted for use in aircraft.

Space limitations and the necessity for weight economy in aircraft require that the seats provided for pilots, co-pilots, and other crew members be compact and as simple in structure as possible. At the same time, it is essential that they provide a wide range of adjustment not only from the standpoint of comfort, but also to enable persons of different stature to have full access to manipulate the various controls of the aircraft and to obtain maximum visibility from the cockpit or operators' enclosure as well as within it. It is desirable that these adjustments be accomplished with a minimum of effort by means that are convenient to the occupant of the seat, and located in such positions that he cannot be confused or complicated with respect to the other aircraft controls.

To prevent injury to the seat occupant as a result of rough air or forced landings, seat belts are conventionally required and are arranged to transmit the force of the occupant due to sudden decelerations to the seat structure which is in turn fastened securely to the structural framework of the aircraft. The elements are so designed that failure resulting from sudden deceleration must occur in the primary structure of the aircraft rather than in the seat or its attachment fittings. To this end, the construction of the seat and the disposition of its principal elements must be such as to promote strength and structural efficiency under extreme impact loads, and the means of attachment to the principal structure of the aircraft must be capable of withstanding the maximum loads to which the seat and its occupant can be subjected without failure of the airplane structure itself. It is usually convenient to attach the seat to the aircraft structure by means of fittings located on the feet of the seat or at the general cockpit floor level.

As an additional feature, it is desirable that the operators' seats in aircraft be readily removable to permit their maintenance and allow access to the various instruments and controls in the cockpit for inspection, repair and servicing.

The loads normally imposed by the occupants of seats of this character are directed against the back or other upper seat elements, as for example, by a pilot in manipulating the aircraft controls. Under these conditions, existing seats designed for the purpose have a general tendency to be insecure and permit a considerable amount of movement due to the accumulation of tolerances between the seat elements. The attachment fittings between the seat and the airplane structure are usually of the pinned type which, while positive in action, become loose through wear and detract from the rigidity of the seat and its mounting.

The primary object of the present invention is to provide a vehicle operator's seat having improved strength-weight characteristics while permitting a wide range of adjustment.

Another object of the invention is to provide an improved means for the attachment of operators' seats of the type under consideration embodying a positive locking action in combination with means for taking up any play between the locking elements due to their manufacturing tolerances or the effect of wear.

Still another object is to provide improved attaching means whereby vehicle operators' seats may be quickly and easily installed or removed for maintenance purposes, while positively locking the seat to the vehicle structure and minimizing movement between the assemblies during use.

Another object of the invention is to provide an adjustable operator's seat especially adapted for aircraft use in which the controls for effecting adjustment are so positioned that their operation may be readily effected without in any way interfering with the normal functions of the seat's occupant.

These and other objects and features of the present invention will be apparent from the following description and the accompanying drawings in which corresponding reference numerals are used to denote similar parts throughout the several views.

In the drawings:

Figure 1 is a front elevation of a vehicle operator's seat embodying the features of this invention;

Figure 2 is a side elevation of the same in which the range and direction of adjustment of the various elements are indicated by broken lines;

Figure 3 is a detail view of the means employed to effect adjustment of the seat back inclination and of locking it positively in the desired position;

Figure 4 is an enlarged detail illustrating the means employed to adjust the vertical height of the chair and to lock it in the desired position;

Figure 5 is a section on line V—V of Figure 4;

Figure 6 is an enlarged detail illustrating the structural arrangement employed to attach the seat to the vehicle structure and to adjust and lock it in fore-and-aft relation;

Figure 7 is a section on line VII—VII of Figure 6;

Figure 8 is a section on line VIII—VIII of Figure 6;

Figure 9 is a section on line IX—IX of Figure 6;

Figure 10 is a partial view of the seat in position for effecting its installation or removal;

Figure 11 is a detail illustrating the means employed for preventing inadvertent detachment of the seat while in use, comprising a section on line XI—XI of Figure 6.

The vehicle operator's seat embodying this invention consists essentially of a frame A comprising a seat 10, back 11, and a pair of arm rests 12 and 12ª, supported on and adapted for vertical sliding adjustment in relation to a unitary supporting frame B. The supporting frame B is adapted to be mounted upon a pair of track members 13 and 14 in such a manner as to permit adjustment of the seat in a fore-and-aft direction and is provided with novel means to positively lock the seat assembly to the track at any of a desired number of positions as well as additional means to frictionally engage the tracks in order to insure a firm and rigid connection thereto.

It is contemplated that the track members 13 and 14 are fastened solidly to the structure of the vehicle in which the operator's seat of this invention is employed. For example, when used in aircraft, it is desirable that the track members 13 and 14 be bolted or riveted to floor members of the cockpit or pilot's enclosure that in themselves are integrally tied in with the primary structure of the airplane. By so doing, the novel attaching and adjusting mechanism of the present invention in combination with the structural arrangement of the seat itself, combine to form a particularly rigid and strong assembly in which the forces impressed upon the seat are efficiently transmitted to the structure of the vehicle in which it is used.

Referring particularly to Figures 1 and 2, the frame A includes a pair of inclined tubes 15 and 16 disposed on either side of the seat. To each tube is attached in spaced relation and as by a pin or by welding, an upper fitting member 17, an upper bearing member 18 and a lower bearing member 19.

Forwardly projecting extensions 20 of the upper fitting members 17 are fitted within and fastened to the open ends of a tubular member 21 which is formed with a radius on either side of the assembly to serve as a support for the arm rests 12 and 12ª, and projects downwards and transversely of the assembly to form the rear lower edge of the seat 10.

The upper bearing members 18 are provided with forwardly extending lugs 22 which are bolted to fittings 23 pinned to the downwardly extending portions of the tubular member 21 for the purpose of providing additional support thereto.

The seat 10 is formed by a generally horizontal tubular frame member 24 having front and side portions shaped to the desired configuration of the seat and welded at its two open ends to the transverse portion of the tubular member 21. The seat structure is completed by a pair of diagonal tubular braces 25 extending at each side between the tubular members 24 and 21, and a pair of lower tubular struts 26 welded to the lower sides of the member 24 and to fittings 27 which are supported in lugs 28 integrally formed as a part of the lower bearing members 19.

A lever 29 for controlling the fore-and-aft adjustment of the seat is pivotally supported in a hinge fitting 30 welded on the fore-and-aft centerline of the seat to a cross tube 31 and in a position that is readily accessible to either hand of an occupant of the seat by manipulation between the legs. It is to be particularly noted that the control lever 29 is conveniently located for actuation without any undue movement on the part of the operator, and yet, being below the seat and displaced rearwardly of its forward edge, cannot interfere in any way with the normal functions and activities of the seat's occupant. By this means, the weight of the seat's occupant is centrally located during fore-and-aft adjustment, so that the operation is accomplished without binding or other difficulty due to unequal forces on the supporting structure.

The arm rests 12 and 12ª are pivotally mounted on the member 21 by means of hinge pins 32 having an operative connection with support brackets 33. The arm rests are swingable to a vertical position upwards as in line with the back 11 to permit egress to the seat from the side, and in their down position are supported against further rotation by the stop pins 34 in the brackets 33, which bear against the member 21.

The back 11 is structurally formed of a single tubular frame member 35 conforming to the desired dimensions and supported for fore-and-aft tilting movement (as indicated by broken lines in Figure 2) on pivot pins 36 extending from and attached to the two upper fitting members 17.

The angle of the back 11 is adjustable and adapted to be locked in desired relation to the seat 10 by means of the mechanism shown in Figure 3. A plate 37 is welded between the ends of the tubular member 35 on the centerline of the seat back and is provided with a slot 38 having a series of notches 38ª corresponding to the desired number of tiltback positions (see Fig. 3). A transverse tube 39 is supported for rotation in projections of the intermediate bearing members 18, and supports at its mid-point a link 40 to which is attached a pin 41 adapted to extend through the slot 38 and engage one or another of the notches 38ª. A locking lever 42 is provided on one or the other end of the tube 39 extending forwardly to a position that is readily accessible to either hand of an occupant of the seat. The link 40 is normally urged into engagement with the notches 38ª by means of a spring (not shown) supported by the tube 39, and acting between the link 40 and the seat structure.

The tiltback adjustment of the seat is effected by depressing the lever 42 to disengage the pin 41 from the notches 38ª. The occupant's back may then be moved to the desired angle with respect to the seat 10, and the lever 42 released, permitting the spring-urged pin 41 to engage the nearest of the notches 38ª and providing a positive lock until further adjustment is desired.

The seat thus far described exemplifies a simple and mechanically efficient structure wherein weight is minimized by the use of tubular elements disposed as nearly as possible to oppose and support the normal loads to which the assembly is subjected in use. The seat 10, back 11 and arm rests 12 and 12ª may be upholstered with any conventional materials to suit the requirements of comfort. We have found that the use of a webbing of canvas strips laced across the seat and back frames and serving as a base for the upholstery provides adequate load support for the weight of the body and has suitable resiliency, contributing to the overall lightness of the seat.

The supporting frame B consists essentially of a pair of rearwardly inclined tubes 45 and 46 spaced apart transversely somewhat less than the transverse distance between the tubes 15 and 16 and joined at their lower ends by a cross tube 47, a pair of rearwardly extending U-shaped channel members 48 and 49 welded to the cross tube 47 and supporting the mechanism for adjusting and locking the seat assembly to the tracks 13 and 14, a pair of inclined braces 50 extending between the tubes 45 and 46 and the channel members 48 and 49 respectively (see Fig. 1), and a tubular cross brace 51 (see Fig. 6) extending transversely between the rear ends of the channel members 48 and 49.

The frame thus formed exemplifies a light, rigid unitary truss for supporting the seat loads and transmitting them to the vehicle structure through the tracks 13 and 14. The frame A is slidably mounted on the tubes 45 and 46 for vertical adjustment, by means of projections 18a and 19a integrally formed on the intermediate and lower bearing members 18 and 19 respectively and provided with bores of a suitable diameter to form a sliding fit thereon.

A plug fitting 52 is pinned to the top of each of the tubes 45 and 46 and is provided with lugs 53 for the attachment of one end of rubber or elastic counterbalancing members 54 which are extended parallel to the tubes 45 and 46 and attached by means of U-clips 55 to rearwardly extending projections of the lower bearing members 19. The counterbalancing members 54 are so proportioned that in the highest position of the frame A with respect to the frame B, they are extended sufficiently to exert a force tending to raise one with respect to the other by an amount somewhat greater than the weight of the frame A without occupant of the seat.

In Figures 4 and 5, the mechanism is shown for adjusting and locking the relative positions of the frames A and B to vary the height of the seat from the floor. A boss 56 on the lower bearing member 19 accommodates a pin 57 for reciprocal movement into and out of engagement with one of a series of spaced holes 58 in the tubular members 45 and 46. The fittings 27 support a cross tube 59 for rotation in response to movement of a control lever 60 pinned to either end thereof. A link 61 is pinned to the cross tube 59 and is connected at its other end by a bolt 62 to the split end of the pin 57. A spiral spring 63 is mounted around the cross tube 59 in such a manner as to urge the pin 57 into engagement with the holes 58.

The frame A is adjusted and locked in relation to the frame B by actuation of the lever 60. When the lever 60 is raised disengaging the pin 57 from the holes 58, the seat occupant relieves his weight from the seat 10 and the counterbalancing members 54 then automatically raise the frame A until the seat 10 is in the desired position. Release of the lever 60 then positions the pin 57 in the nearest of the holes 58, providing a positive lock until further adjustment is desired. The seat may be lowered by following the same procedure and allowing the weight of the occupant to act against the seat 10, while the lever 60 is in a raised position.

As thus described, the invention exemplifies a vehicle operator's seat assembly comprising a frame forming a seat and an adjustable back, a second unitary frame having a pair of braced rearwardly inclined tubular support members, means for supporting the first frame for slidable adjustment on the tubular supports of the second frame, resilient counterbalancing members attached at one end to the first frame, and at the other end to the second frame tending to move one with respect to the other, and means for selectively positioning and locking one frame with respect to the other.

Figure 6 in particular, illustrates a preferred means of effecting and locking the fore-and-aft adjustment of the seat assembly and for attaching it to the vehicle structure.

The tracks 13 and 14 are formed with an upper flange 65, a lower flange 66 for attaching the track to the vehicle structure as by rivets or bolts, and a vertical web 67 (see Fig. 11). The frame B is adapted to be movably supported on the tracks by means of a pair of forward rollers 68 (see Fig. 8) and a pair of rear rollers 69. Each roller is rotatably mounted on a bolt 70 passing through holes in the depending side portions 71 of a U-shaped bearing bracket 72 welded or otherwise fastened to the lower sides of the channel members 48 and 49 in the positions indicated, and as most clearly shown in Figure 8. The lower edges of the side portions 71 are formed inwardly so that the opening between them is somewhat less than the width of the track flange 65, but permit clearance for the track web 67. When the seat is mounted on the tracks 13 and 14, it may be rolled fore-and-aft on the pairs of rollers 68 and 69, but is constrained against transverse movement by engagement of the side portions 71 against the sides of the upper track flanges 65, and against vertical movement by engagement of the inturned edges of the brackets 72 bearing against the under surfaces thereof.

The seat assembly may be positively locked in fore-and-aft position by engagement of pins 73 vertically supported at the rearward ends of the channel members 48 and 49 in one of a series of holes 74 drilled into the upper flanges of the tracks 13 and 14. To support each pin 73, a U-shaped bracket 75 is welded within the side portions of each of the channel members 48 and 49, and a hole 76 in their upper surfaces serves as a bearing for the upper end of the pins 73. The lower ends of the pins 73 are disposed through clearance holes in the channels 48 and 49 and are supported in guides 77 in lower bearing members 78 which are welded to the bottom surfaces of the channels 48 and 49. The pins 73 are normally urged into their down position by compression springs 79 acting against the lower side of the brackets 75 and a yoke member 80, pinned to each of the pins 73.

As a means of operating the pins 73, each yoke member 80 is formed with an integral rearwardly extending projection 81 having a slot 82 which accommodates a pin 83 supported between the projecting ends of a pair of arms 84. The arms 84 are attached for rotation with a tube 85 which extends across the frame B and is journalled in bearing holes within the brackets 75 on either side thereof. Rotation of the tube 85 and the arms 84 raises the yokes 80 by reason of the engagement of the pins 83 in the slots 82, and lifts the pins 73 from engagement with the holes 74 in the tracks 13 and 14. A bell crank 86 depends from the tube 85 on the fore-and-aft centerline of the seat and is pinned thereto at its upper end. The lower end 87 is attached by a cable 88 (see Fig. 2) to the lever 29 by pin and clevis attachments. Thus, the actuation of the pins 73 against the springs 79, in order to adjust the fore-and-aft position of the seat, is accomplished by movement of the lever 29 to rotate the tube 85 and retract the pins 73 as hereinbefore described.

One of the primary features of the present invention resides in the novel means for securing the seat to the vehicle structure by means of clamps supported at the corners of the frame B associated with the rollers 68 and 69 to frictionally engage the tracks 13 and 14 in such a manner as to take up any play or looseness between the seat and the vehicle caused by the tolerances between the rollers and tracks, or by wear therein.

The means for clamping the frame B to the tracks 13 and 14 consists essentially of a pair of forward gripping members 89 located aft of the rollers 68 and a pair of rearward gripping members 90 located aft of the rollers 69, on either side of the frame B and supported for limited vertical movement from and in relation to the channels 48 and 49. Each of the gripping members 89 and 90 is constructed as shown in Figure 9 and consists of a U-shaped clip 91 which is wide enough to freely clear and to slide over the sides of the channel members 48 and 49. Lugs 92 having an inwardly turned flange 93 are disposed at the lower ends of depending side portions 91ª of the U-shaped clip 91 and are fastened thereto by means of a bushing 94 extending between the inner surfaces of the lugs 92 and held in spaced relation by a rivet 95. Holes in the opposite sides of the channel members serve as bearings for a shaft 97 which is fastened to an eccentric cam member 98 and is provided with means for causing its rotation consisting of a lever 99 fastened to a projecting end thereof. The projecting ends of the shaft 97 pass through vertical slots 100 in the side portion 91ª of the clip 91 and are proportioned to permit limited vertical motion of the clip 91 with respect to the channel member 48 but not horizontal motion. The upper surface of the cam 98 is adapted to engage the lower side of the horizontal portion of the clip 91 to force it upwardly in response to counterclockwise rotation of the lever 99, as seen in Figure 6. When the frame B is mounted on the tracks 13 and 14 the upper flanges 65 of the latter are disposed between the lugs 92 of the gripping members 89 and 90 in such a way that the flange portions 93 are located below them. Raising of the gripping members by means of the cam 98 frictionally engages flanges 93 against the lower sides of the flange 65 and locks the frame B to the tracks 13 and 14 to prevent any loose movement therebetween. In disengaged position, each of the gripping members 89 and 90 is positioned by means of a U-shaped flat spring 101 fastened to the lower side of the channel members 48 and 49 and having an end 102 formed to contact the bushing 94.

The upper ends of the levers 99 on each side of the frame B are pinned to a tubular link 103 whose ends are flattened and slotted at 103ª. The rear of lever 99 is also pinned to a slot 104ª in a link 104 pivotally attached at its other end to an arm 105 which is attached for rotation with the tube 85. A torsion spring 106 acting between a stud 106ª and the rear edge of the lever 99, and being supported around the projecting end of the shaft 97 normally urges the levers 99 into counterclockwise rotation to clamp the seat to the tracks 13 and 14. The slots 103ª and 104ª are so proportioned that counterclockwise rotation of the levers 99 is independently unrestricted when the tube 85 is rotated to engage the pins 73 in the holes 74, but releases the gripping members 89 and 90 from clamping engagement with the tracks 13 and 14, when the lever 29 is actuated to raise the pins 73. Thus the clamping action of each of the gripping members 89 and 90 is independently spring controlled in such a manner that any play that exists at any point of contact between the seat and the tracks 13 and 14 is immediately taken up by means of the wedging of the cams 98 against the clips 91. Release of the gripping members from the tracks 13 and 14 occurs simultaneously with the disengagement of the pins 73 from the holes 74.

Each of the tracks 13 and 14 is provided at its rear end with a stop 65ª fastened to the upper flange thereof and adapted to engage the bearing members 78 and limit movement of the frame B to the rear. The upper flange 65 of each of the track members 13 and 14 is removed or relieved at the forward end thereof for a distance representing the dimension between the forward edge of roller bearing bracket 72 and the rearward edge of gripping member 89. As shown in Figure 11, each of the track members 13 and 14 is provided with a hinged stop member 107 located at approximately the mid-point thereof and being pivotally supported on a bearing 108 which is secured to the floor. The upper flange 65 of each of the track members 13 and 14 is relieved or removed at a position opposite the stop member 107 for a distance slightly greater than its length which is equal to the distance between the forward edge of the bracket 72 and the rearward edge of the gripping member 90, and the bearing 108 is so positioned that stop member 107 may be rotated over the track member so that a recess 109 fits over the web 66 thereof and fills up that portion of the track wherein the flange 65 had been removed. An upward projection 110 of the stop member 107 is sufficiently high to engage rear roller bracket 72 and limits movement of the frame B forwardly when thus engaged. When the stop member 107 is rotated to the dotted position shown in Fig. 11, the frame B and the entire seat may be moved forwardly so that the rear bearing bracket 72 and the rear gripping member 90 are positioned over the portion of the track from which the upper flange 65 has been removed and the seat may then be raised for removal thereof from engagement with the tracks 13 and 14. In this position, the forward bracket 72 and gripping member 89 are located at the front of the track, and since the flange at this portion thereof has been removed, these elements too present no restriction to upward removal of the seat. Installation of the seat is accomplished by placing the chair on the tracks so that the bearing brackets and gripping members engage the tracks at the portions where the upper flange has been removed, and simply pushing the seat in a rearward direction. The seat may then be locked against accidental removal by rotating the stop members 107 into engagement with the track webs 67.

The invention is not to be understood as restricted to the details herein set forth, since these may be modified within the scope of the appended claims, without departing from the spirit and scope of the invention. Having thus described the invention what we claim is new and desire to secure by Letters Patent is:

1. In a vehicle seat structure, a flanged track secured to the structure of said vehicle, a seat adapted to be movably supported on said track for positional adjustment with respect to the vehicle, means on said seat having an operative connection with said flange to prevent separation of said seat from said track, fixed stop means on one end of said track to limit the movement of said seat on said track in one direction and movable stop means for engaging said track to limit movement of said seat with respect to the track in the other direction, said movable stop means being movable out of engagement with said track to permit separation of the seat from said track.

2. A vehicle seat comprising a first unitary frame adapted to be adjustably secured to the structure of said vehicle having a pair of parallel rearwardly inclined elongated support members oppositely disposed in the transverse plane of said seat, a second frame having a pair of elongated support members respectively adapted to cooperate with said inclined members of said first frame for movable support thereon, resilient means attached to and extending between the support members of said frames to counterbalance the weight of the seat's occupant, a substantially horizontal seat structure secured to the support members of said second frame, an inclinable back member, means for pivotally mounting said inclinable back member between the upper ends of said support members of said second frame, a plurality of spaced bearing means associated with each of said support members of said second frame adapted to adjustably support said second frame on said support members of said first frame, and manually actuable locking means operatively associated with one of the support members of said second frame engaging the support member of said first frame to position one with respect to the other.

3. A vehicle seat comprising a first unitary frame adapted to be adjustably secured to the structure of said vehicle having a pair of parallel rearwardly inclined elongated support members oppositely disposed in the transverse plane of said seat, a second frame having a pair of elongated support members respectively adapted to cooperate with said inclined members of said first frame for movable support thereon, a substantially horizontal seat structure secured to the support members of said second frame, an inclinable back member, means for pivotally mounting said inclinable back member between the upper ends of said support members of said second frame, a plurality of spaced bearing members on each of said support members adapted to adjustably support said second frame on said support members of said first frame, manually controllable means to adjust the position of said first frame with respect to said vehicle structure, manually controllable means to adjust the vertical position of said second frame with respect to said first frame, and manually controllable means to adjust the inclination of said back member with respect to said seat structure.

4. A vehicle seat comprising a first unitary frame adapted to be adjustably secured to the structure of said vehicle having a pair of parallel rearwardly inclined elongated support members oppositely disposed in the transverse plane of said seat, a second frame having a pair of elongated support members respectively adapted to cooperate with said inclined members of said first frame for movable support thereon, a substantially horizontal seat structure secured to the support members of said second frame, an inclinable back member, means for pivotally mounting said inclinable back member between the upper ends of said support members of said second frame, a plurality of spaced bearing members on each of said support members adapted to adjustably support said frame on said support members of said first frame, means to adjust the position of said first frame with respect to said vehicle structure operatively connected to a manual control associated with the forward edge of said seat structure within reach of an occupant of said seat, means to adjust the vertical position of said second frame with respect to said first frame operatively connected to a manual control means on one side of said seat structure associated with one of the support members of said second frame, and means to adjust the inclination of said back member with respect to said seat structure operatively connected to a manual control means on one side of said seat structure associated with one of the support members of said second frame.

5. In combination with a vehicle seat adapted to be adjustably secured to the vehicle structure, a track attached to the vehicle structure, a plurality of spaced bearing means associated with said seat adapted to engage said track, a plurality of clamping means, one of which is operatively positioned adjacent each of said bearing means adapted normally to frictionally engage said track to hold said bearing means to said track at a pre-selected position, and unitary means associated with said seat having an operative connection with each of said clamping means for simultaneously controlling the engagement of said clamping means with said track.

6. In combination with a vehicle seat adapted to be adjustably secured to the vehicle structure, a pair of tracks attached to the vehicle structure, a plurality of spaced roller bearing means associated with said seat adapted to engage each of said tracks, a plurality of clamping means, one of which is operatively positioned adjacent each of said roller bearing means adapted normally to frictionally engage said tracks to hold said bearing means to said track at a pre-selected position of said seat, and unitary manually operable means located on said seat adjacent the front of said seat on the fore-and-aft center line thereof and having an operative connection with each of said clamping means for simultaneously controlling the engagement of said clamping means with said track.

7. In combination with a vehicle seat adapted to be adjustably secured to the vehicle structure, a track attached to the vehicle structure, a plurality of spaced roller bearing means associated with said seat adapted to engage said track, a plurality of clamping means, one of which is operatively positioned adjacent each of said roller bearing means adapted normally to engage said track to hold said roller bearing means to said track, resilient means normally biasing each of said clamping means into frictional engagement with said track and unitary means operatively connected to each of said clamping means and actuable by the seat's occupant to simultaneously disengage all of said clamping means from said track.

8. In combination with a vehicle seat adapted to be adjustably secured to the vehicle structure, a flanged track attached to the vehicle structure, a plurality of spaced roller bearing means associated with said seat adapted to engage the flange of said track, a plurality of clamping means, one of which is operatively positioned adjacent each of said roller bearing means, for holding said bearing means to said track at a preselected position comprising a cam-operated member having portions frictionally engaging the flange of said track, resilient means operatively connected with each of said clamping means normally urging said clamping means into engagement with the flange of said track, and unitary manually actuable means adapted for operation by an occupant of said seat connected with all of said clamping means to simultaneously release said clamping means from engagement with said flange.

9. In combination, a seat adapted to be movably supported in a vehicle, a track secured to the structure of said vehicle, a plurality of spaced roller bearing means associated with said seat adapted to engage said track, means associated with said seat to engage and positively lock said seat in selective position with said track, and a plurality of clamping means associated with said seat, one of said clamping means operatively positioned adjacent each of said roller bearing means normally to frictionally engage said track and prevent movement of said bearing means in relation thereto.

10. In combination, a seat adapted to be movably supported in a vehicle, a track secured to the structure of said vehicle, a plurality of spaced bearing means associated with said seat adapted to engage said track, a pin associated with said seat to engage one of a series of holes in said track and positively lock said seat in selective position with said track, and a plurality of clamping means operatively associated with said seat, one of said clamping means operatively positioned adjacent each of said bearing means normally to frictionally engage said track and prevent movement of said bearing means in relation thereto.

11. In combination, a seat adapted to be movably supported in a vehicle, a track secured to the structure of said vehicle, a plurality of spaced bearing means associated with said seat adapted to engage said track, actuable means associated with said seat to engage said track and positively lock said seat in selective position with said track, a plurality of resiliently biased clamp means operatively associated with said seat, one of said clamp means operatively positioned adjacent each of said bearing means normally frictionally engaging said track to prevent movement of said bearing means in relation thereto, and unitary control means operable by the occupant of said seat having an operative connection with said locking means and with all of said clamp means to simultaneously unlock and unclamp said seat from said track to allow adjustment of one with respect to the other.

FRANCIS A. PALL.
LEO A. PFANKUCH.

References Cited in the file of this patent
UNITED STATES PATENTS

| Number | Name | Date |
| --- | --- | --- |
| 131,892 | O'Hara | Oct. 1, 1872 |
| 1,603,042 | Geary | Oct. 12, 1926 |
| 1,735,518 | Van Valkenburg et al. | Nov. 12, 1929 |
| 1,962,789 | Simpson et al. | June 12, 1934 |
| 1,964,405 | Nenne | June 26, 1934 |
| 2,000,463 | Browne | May 7, 1935 |
| 2,041,648 | Pepper | May 19, 1936 |
| 2,130,159 | Saunders et al. | Sept. 13, 1938 |
| 2,210,727 | McGregor | Aug. 6, 1940 |
| 2,292,414 | Vernon | Aug. 11, 1942 |
| 2,367,829 | Shinn | Jan. 23, 1945 |
| 2,383,173 | Watter | Aug. 21, 1945 |
| 2,459,843 | Scholander | Jan. 25, 1949 |